United States Patent Office 2,901,500
Patented Aug. 25, 1959

2,901,500

LOWER ALKYL ESTERS OF N-CYANOALKYL-N-ALKYL THIOLCARBAMIC ACIDS AS COMPOSITIONS

Harry Tilles, El Cerrito, and Joe Antognini, Mountain View, Calif., assignors to Stauffer Chemical Company, a corporation of Delaware No Drawing. Application February 13, 1957
Serial No. 639,866

4 Claims. (Cl. 260—455)

This invention relates to certain novel lower alkyl esters of N-cyanoalkyl-N-alkyl thiolcarbamic acids as herbicides. More specifically, the invention relates to compounds of the general formula:

$$R_1S-\overset{O}{\underset{\|}{C}}-N\underset{R_2}{\overset{CH_2CH_2C\equiv N}{\diagup}}$$

wherein $R_1$ is a lower alkyl group and $R_2$ is a lower alkyl group.

Preferred substituent groups are:

| $R_1$ | $R_2$ |
|---|---|
| $CH_3$ | $CH_3$ |
| $C_2H_5$ | $C_2H_5$ |
| n—$C_3H_7$ | n—$C_3H_7$ |
| n—$C_4H_9$ | |
| i—$C_3H_7$ | |

The novel compounds of the preent invention may be made in accordance with the following non-limiting examples. Code numbers have been assigned to each compound and are used throughout the balance of the application.

*Example 1.—(R–2094).*—10 g. (0.080 mole) of ethyl chlorothiolformate was dissolved in 125 cc. of ethyl ether and the solution was cooled to 5–10° C. in an ice bath. 13.9 g. (0.165 mole) of beta-methylaminopropionitrile was slowly added, keeping the reaction mixture cool by means of an ice bath. The reaction mixture was then filtered from the solid amine hydrochloride and the ether filtrate was concentrated on a steam bath with the aid of a current of air. There was obtained as a residue, 14 g. of ethyl N-methyl-N-2 cyanoethylthiolcarbamate, $n_D^{27}$ 1.4971.

*Example 2.—(R–2095).*—When the general procedure of Example 1 was repeated except that 12.4 g. (0.148 mole) of betamethylaminopropionitrile and 10 g. (0.072 mole) of n-propyl chlorothiolformate were employed, there was obtained 14 g. of n-propyl N-methyl-N-2-cyanoethylthiolcarbamate, $n_D^{28}$ 1.4954.

*Example 3.—(R–2096).*—When the general procedure of Example 1 was repeated except that 11.3 g. (0.134 mole) of betamethylaminopropionitrile and 10 g. (0.066 mole) of n-butyl chlorothiolformate were employed, there was obtained 11.7 g. of n-butyl N-methyl-N-2-cyanoethylthiolcarbamate, $n_D^{29}$ 1.4947.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10, based on the seeds which germinated. Thus, 100–10 indicates normal germination and normal growth.

The following data were obtained:

| Compound | Oats | | Cucumber | | Radish | |
|---|---|---|---|---|---|---|
| | Percent Germ. | Growth | Percent Germ. | Growth | Percent Germ. | Growth |
| R-2094 | 0 | | 0 | | 0 | |
| R-2095 | 0 | | 0 | | 0 | |
| R-2096 | 0 | | 0 | | 0 | |

The above tests were then repeated using application rates of 10 and 40 pounds per acre with the following results:

| Compound | Rate-Acre, lbs. | Pea | | Corn | | Radish | | Rye | | Cucumber | |
|---|---|---|---|---|---|---|---|---|---|---|---|
| | | Ge. | Gr. | Ge. | Gr. | Ge. | Gr. | Ge. | Gr. | Ge. | Gr. |
| R-2095 | 10 | 100 | 10 | 100 | 10 | 100 | 10 | 25 | 4 | 100 | 9 |
| | 40 | 100 | 10 | 100 | 10 | 100 | 10 | 0 | | 100 | 9 |
| R-2096 | 10 | 100 | 10 | 100 | 10 | 100 | 10 | 15 | 2 | 50 | 7 |
| | 40 | 100 | 10 | 100 | 10 | 100 | 8 | 0 | | 50 | 7 |

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:
1. The chemical compound:

$$R_1S-\overset{O}{\underset{\|}{C}}-N\underset{R_2}{\overset{CH_2CN_2C\equiv N}{\diagup}}$$

wherein $R_1$ is a lower alkyl group and $R_2$ is a lower alkyl group.

2. The chemical compound ethyl N-cyanoethyl-N-methyl thiolcarbamate.

3. The chemical compound n-propyl N-cyanoethyl-N-methyl thiolcarbamate.

4. The chemical compound n-butyl N-cyanoethyl-N-methyl thiolcarbamate.

(References on following page)

References Cited in the file of this patent

UNITED STATES PATENTS

| | | |
|---|---|---|
| 2,160,880 | Loane et al. | June 6, 1939 |
| 2,372,895 | Harman | Apr. 3, 1945 |
| 2,562,011 | Baumgartner | July 24, 1951 |
| 2,608,575 | Mathes | Aug. 26, 1952 |
| 2,631,935 | Baumgartner | Mar. 17, 1953 |
| 2,642,451 | Weijlard et al. | June 16, 1953 |
| 2,687,348 | Kosmin | Aug. 24, 1954 |
| 2,786,866 | Hook et al. | Mar. 26, 1957 |